United States Patent [19]

Durbin

[11] Patent Number: 5,120,029
[45] Date of Patent: Jun. 9, 1992

[54] LININGS FOR CRUCIBLE FURNACES AND TRANSFER VESSELS AND METHOD OF APPLYING SAME

[76] Inventor: Robert J. Durbin, 224 S. 118th Ct., Seattle, Wash. 98168

[21] Appl. No.: 376,935

[22] Filed: Jul. 7, 1989

Related U.S. Application Data

[63] Continuation of Ser. No. 157,881, Jul. 19, 1988, abandoned.

[51] Int. Cl.⁵ ............................................. G21B 3/00
[52] U.S. Cl. .................................. 266/275; 266/280; 432/264
[58] Field of Search ............... 266/280, 900, 275, 242, 266/286; 432/264, 248

[56] References Cited

U.S. PATENT DOCUMENTS

| | | | |
|---|---|---|---|
| 1,829,352 | 10/1931 | Heames et al. | 432/264 |
| 2,264,740 | 12/1941 | Brown | 266/900 |
| 3,227,431 | 1/1966 | Steeves | 432/264 |
| 3,345,059 | 10/1967 | Swindt | 266/280 |
| 3,539,169 | 11/1970 | Higgs et al. | 266/900 |
| 4,202,538 | 5/1980 | Shimada et al. | 266/275 |

Primary Examiner—Scott Kastler
Attorney, Agent, or Firm—Delbert J. Barnard

[57] ABSTRACT

A crucible furnace or molten metal transfer vessel is provided with a composite lining having an outer insulating liner and an inner cast working liner. The insulating liner has a high insulating characteristic and the working liner has a high heat-retention characteristic.

18 Claims, 1 Drawing Sheet

LININGS FOR CRUCIBLE FURNACES AND TRANSFER VESSELS AND METHOD OF APPLYING SAME

This application is a continuation of application Ser. No. 07/157,881, filed Feb. 19, 1988, now abandoned.

TECHNICAL FIELD

The present invention relates to linings for crucible furnaces and transfer vessels used to repetitively handle molten metal and provides an improved composite lining.

BACKGROUND ART

In a crucible furnace, the metal to be heated is placed in a silicon carbide crucible supported on a pedestal within a furnace which is commonly heated by gas-fired or oil-fired burners acting on the crucible. The furnace has a steel shell with an internal lining. The working inner face (hotface) of the shell lining is subjected to the maximum temperature in the furnace and is spaced from the crucible a predetermined distance. Hence, since the maximum size of crucible for a given furnace is limited by the thickness of the lining, it is desirable to minimize the lining thickness.

In the handling of molten metal, it is advantageous to have a durable lining with the physical ability to withstand the conditions at the hotface for long life while also insulating against heat loss from the vessel. Unfortunately, strong refractory materials generally do not have the heat resistivity required to meet efficient thermal requirements.

In the past, it has been common in the crucible furnace art to use ceramic fiber liner material offering reactively fast installation with no cure-out and good insulation quality. The disadvantages are relatively poor heat retention and resistance to burner erosion, and short life due to poor resistance to metal spills. Various castable refractories have been used having the advantage of being inexpensive but having as disadvantages poor resistance to erosion and metal attack if formulated for a good insulation characteristic and poor heat retention if formulated for strength. Also, the castable refractories have been criticized as being messy and unduly time-consuming to apply and as requiring long cure-outs. Various plastics have also been used to give strong mechanical strength to resist erosion and good resistance to metal wetting, but these too have had relatively poor heat retention and insulation characteristics, have been overly time-consuming to install, and have involved extensive cure-out schedules.

DISCLOSURE OF THE INVENTION

Since there is not a single ideal liner layer, the present invention aims to provide a composite liner which is relatively thin overall to maximize capacity and which has improved thermal efficiency to the extent of substantially decreasing fuel consumption and shortening the melting period in a crucible furnace. The invention also aims to provide a liner which is easy and quick to apply, has a long life, and is advantageous for lining transfer vessels, such as ladles, as well as crucible furnaces.

The composite lining of the present invention has an outer insulating liner with an unusually good insulating ability and a dense inner working liner with a durable hotface. The working liner has a high heat-retention characteristic and low insulating value as compared to the insulating liner, and is cast in position. The insulating liner is applied in board-like form and has adequate structural strength to support the working liner at high temperatures and to serve as an outer form complementing a portable inner form when the working liner is cast.

The present invention permits the working liner to be selected in terms of density, volume (thickness), K-factor (thermal conductivity), and specific heat to define a heat-retention capability maximizing thermal efficiency. It has been found that, ideally, the heat-retention capability should approximate the heat required to melt the metal being heated in the crucible and raise its temperature to casting temperature after taking into account exterior heat losses via the furnace shell. The composite lining of this invention, by providing a relatively thin, outer insulating liner (layer) with a high insulating characteristic between the furnace shell and an inner working liner (layer) of high heat-retention ability, makes it possible to obtain the desired heat-retention capability for the working liner without increasing the overall liner thickness. In fact, it has been possible in some crucible furnace operations to decrease the liner thickness, and therefore increase the furnace capacity, while at the same time decreasing fuel consumption and decreasing the heating period for each cycle of bringing a charge (aluminum, for example) from room temperature to a casting state.

In carrying out the present invention, it is preferred to use a readily castable, water-free refractory material for the working liner, such as the "DRI-VIBE" ® refractories made by Allied Mineral Products, Inc., Columbus, Ohio. Such includes "DV60A" ®, which has been used in the practice of this invention for aluminum-melting crucible furnaces. This liner material is 60% $Al_2O_3$, 38% $SiO_2$, and 2% $TiO_2$, in addition to containing heat-setting sintering mechanisms, and has a density of about 145 pounds per cubic foot. It develops adequate strength after one hour at 800° F. to initiate use.

For the insulating liner of the composite lining, it is preferred to use a product such as "BARNES-BOARD," ® sold by R. A. Barnes, Inc., Seattle, Washington, which is a fiberboard-type product containing silica (73%-91%), mineral wool or other suitable inorganic fibers (1%-6%), organic fibers (1%-3%), calcium silicate (3%-5%), diatomaceous earth (2%-5%), and binder (2%-8%), such as a suitable phenolic resin. This product has a density in the range of about 40 pounds per cubic foot and a K-factor of about 0.25 at room temperature, compared to a K-factor of about 10.0 for the "DV60A" ® refractory material. Typically, the insulating liner is one inch thick and is in sheet form, with parallel V-grooves extending at regular intervals along its length so that the sheet may be readily bent in a circle and with the sections between grooves forming chords of the circle.

The above-identified fiberboard product, preferred for the insulating liner, has an unusually low K-factor through a wide temperature range and also maintains adequate crushing strength through a wide temperature range to support the working liner. For example, a thermal conductivity test, ASTM C-201, indicates that when the hotface of the insulating liner board is 1993° F., the coldface is only 202° F.; and a hot crushing test on two-inch cubes of the liner board indicates an average crushing pressure of 27 psi at 1000° F. and 11 psi at 2000° F. to reach 20% deformation. The cold crushing strength is 225 psi.

BEST MODE FOR CARRYING OUT THE INVENTION

Figure 1:
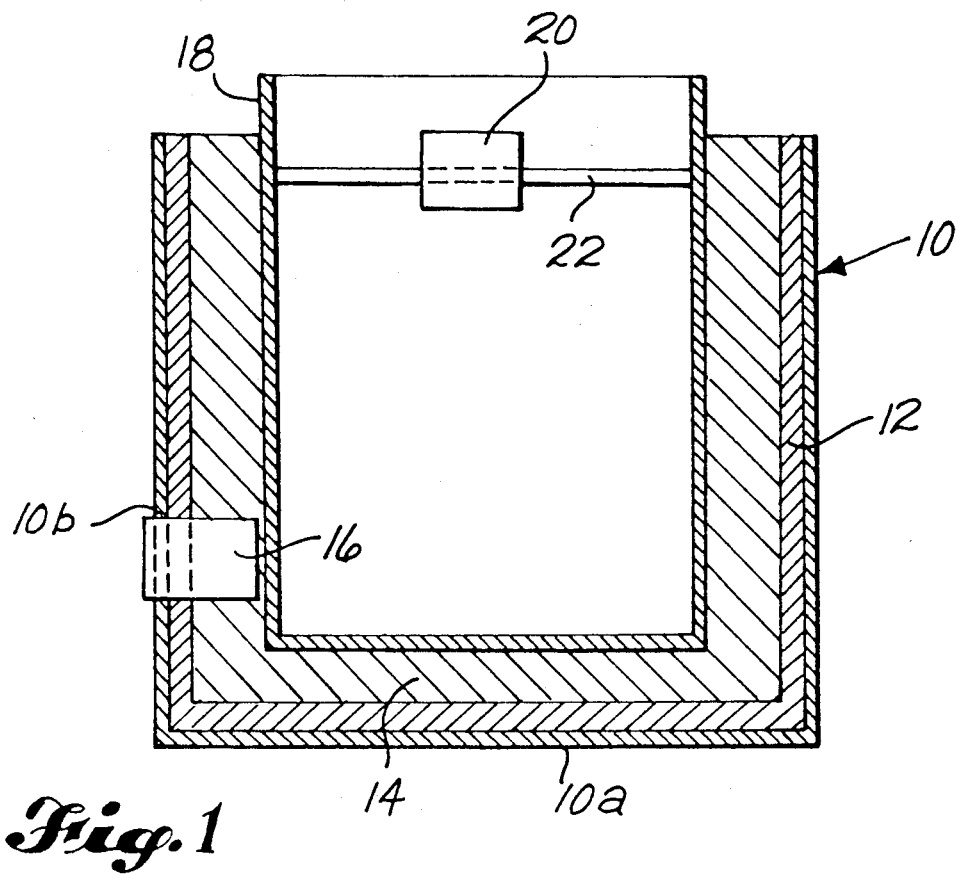
FIG. 1 is a vertical cross section through the center of a crucible furnace at completion of casting the working liner and before removal of the inner casting form and burner plug.
Figure 2:
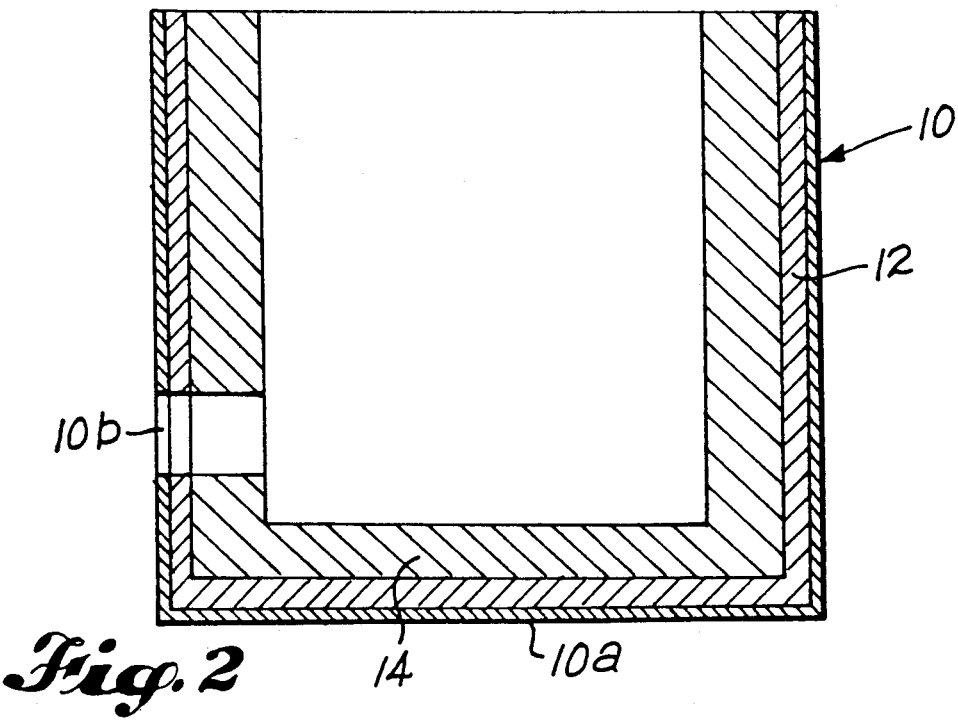
FIG. 2 is a vertical cross section through the center of the lined furnace before installation of the burner and crucible.

A typical crucible furnace has a cylindrical shell 10 with a flat, closed bottom 10a. The burner(s) extends through a side port 10b in the shell and lining. After the used lining to be replaced is removed and the burner(s) is shifted out of the way, in the practice of the present invention, sections of insulating board are fitted around the inside of the cylindrical side wall and over the round bottom wall of the furnace shell to provide an insulating liner 12. Dry refractory material 14 for the working liner is then poured into the shell to a desired height from the bottom circular insulating liner portion and hand-tamped and de-aired to get a smooth, compact, level surface. Preferably, a vent hole is provided in the bottom by using a ceramic tube, wooden dowel or other suitable core. A plug 16 is also provided for each burner port. Then a cylindrical steel form 18 is lowered into the shell, onto the bottom layer of refractory material, and its outer face engages the end of the burner port plug(s) 16, which is correspondingly shaped. Refractory material 14 is then poured between the steel form and the surrounding insulating liner 12, which then also functions as a form.

The next step is to vibrate the steel form 18 as by mounting a portable vibrating machine 20 on a rod 22 extending diametrically across the top of the form. Following this step, the refractory 14 is heated for at least one hour at 800° F. as by a heating torch set in the steel form, whereupon the form is cooled and lifted out of the furnace. Removal of the burner plug 16 completes the lining operation.

The theoretical heat requirements for a well-designed 450-lb, gas-fired, aluminum-melt crucible furnace having a crucible and pedestal weight of 250 lbs and a steel shell weight of 500 lbs is as follows using the composite liner materials previously discussed and assuming a one-inch thick insulating layer and a five-inch thick working layer in a furnace having an inside diameter of 42 inches and an inside height of 39 inches:

| | |
|---|---|
| K-factor for insulating liner | .33 |
| K-factor for working liner | 9.80 |
| $R = \dfrac{thickness}{K}$ | |
| $R = \dfrac{1}{.33} + \dfrac{5}{9.8} = 3.5$ | |
| Heat loss at 220° F. = | 377 BTUH/ft$^3$ |
| Coldface area = | 45.4 ft$^2$ |
| Heat loss through lining = | 17,124 BTUH |
| Volume of working liner = | 14.14 ft$^3$ |
| Density of DV60A = | 145 lb/ft$^3$ |
| Weight of working liner = | 2050 lbs |
| Mean temperature of working liner | 1020° F |

-continued

| | |
|---|---|
| at casting temperature of Al = (Coldface of working liner = | 530° F.) |
| Specific heat of working liner = | 0.258 |
| Heat retention (working liner) (205)(1020)(.258) | 539,478 BTUH |

A typical, current, 6-inch thick lining system for such a furnace would have the top 20 inches of the 39-inch height as a ceramic fiber working layer to a thickness of 3 inches, and would have the remaining 3 inches outside of the ceramic fiber and the 6 inches of lining below the ceramic fiber as a castable, dense refractory, having, for example, a specific weight of 130 lb/ft$^3$ and a K-factor of 4.0 at 1000° F. mean temperature. Assuming ceramic fiber typical values of 9 lb/ft and a K-value of 1.0 at 1000° F. mean temperature, a calculation will show a heat loss of 7600 BTUH and heat retention of only 128,466 BTUH as compared to the 539,478 BTUH heat retention of the composite lining of this invention for the same furnace.

A typical start-up of a crucible furnace with the composite liner of the present invention to achieve a first heat will typically take about twice as long as for subsequent heats. By use of the composite lining of the present invention, the heat-retention ability of the lining can be selected to shorten the melt period. Since there is a maximum rate at which the metal charge being melted in the crucible will absorb heat, there is little advantage in having a surplus of heat-retention ability in the working liner. In fact, too much surplus can result in breakage of the crucible. Accordingly, it has been discovered that it is preferable to make the heat-retention ability of the working lining approximately equal to the heat required to melt the charge and raise it to casting temperature. This heat requirement can be readily calculated for a given weight of metal being melted since the specific heat, melting temperature, heat of fusion, and casting temperature will be known. Hence, the composite lining of the present invention can be readily engineered to provide the preferred heat retention in the lining.

Although the foregoing discussion has been directed to crucible furnaces, the composite lining of the invention is of value for molten metal transfer vessels such as ladles. Because of the increased heat retention by the lining, the tap temperature of the molten metal at the melt furnace can be lower at the start of the transfer operation than otherwise, thus saving energy and wear on the furnace, reducing oxidation of the molten metal, and allowing for more consistent temperatures in the casting operations. Furthermore, the lining in the ladle will last significantly longer than before. In this regard, a thin, third liner layer can be applied to the working liner as a wear surface to be replenished to increase the life of the rest of the liner.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A vessel for thermally efficient handling of molten material, comprising:
   a rigid outer shell; and a composite lining in said shell comprising an inner working liner and an outer insulating liner between the shell and the working liner and supporting the working liner against movement toward said outer shell when said working liner is subjected to molten material, said working liner being a cast-in-place monolithic layer of a dense refractory material having a high K-factor and a high heat-retention capability, and said working liner being cast bonded to and covering said insulating liner;

said insulating liner being composed of predominantly refractory materials and a binder and having a low K-factor through a wide temperature range, and having a high insulating capability and a low heat-retention capability in comparison to said working liner, and having a substantial crush-resistance density sufficient to provide external support for said working liner throughout a relatively wide temperature range;

wherein the insulating liner is formed from a precast fiber reinforced board containing between 73%-91% silica;

wherein the binder is a phenolic resin; and wherein the insulating liner is about one inch thick and has a K-factor of about 0.25 at room temperature.

2. A method of lining a container in which molten material is formed or handled, said vessel having a closed bottom and an open top, and said method comprising:

covering the inside of the vessel with an insulating liner comprising sections of dry precast board having a low K-factor and a high insulating capability through a wide temperature range;

inserting a form through the open top of the vessel, which is spaced inwardly from said insulating liner so that said inserted form is positioned as an inner form and said insulating liner is positioned as an outer form;

filling the space between said insulating liner and inserted form with a castable working liner material which becomes monolithic and has a high K-factor and a high heat-retention capability when heated to a predetermined setting temperature for a predetermined time period, said insulating liner having sufficient crush-resistance density to provide outside support for said working liner through a wide temperature range above said setting temperature;

heating said working liner material to said setting temperature for said time period to form a monolithic working liner from said working liner material which has a high heat-retention capability and which covers and is cast bonded to the insulation liner; and removing said inserted form through said open top.

3. A method according to claim 2, wherein said inserted form is vibrated before said liner material is heated to compact said working liner material.

4. A method according to claim 2, wherein the closed bottom of the vessel is covered with a layer of said castable working liner martial after being covered with said insulating liner and before said form is inserted so that said form rests on said layer when inserted.

5. A method according to claim 2, wherein said vessel has a side port for a burner, and a removable plug covering said port and extending from the port inwardly to the location of said inserted form is inserted before said castable working liner material is placed in the vessel to the level of said port, said plug being removed after said working liner is formed.

6. A method according to claim 2, wherein sad castable liner material is a dry, granular material when placed in said vessel.

7. A method according to claim 2, wherein said vessel and said inserted form are generally cylindrical.

8. A method according to claim 2, wherein said insulating liner has a density of about 40 pounds per cubic foot.

9. A method according to claim 2, wherein said insulating liner and working liner have K-factors of about 0.25 and 10.0, respectively, at room temperature.

10. A method according to claim 2, wherein said insulating liner is substantially thinner than said working liner.

11. A method according to claim 2, wherein said insulating liner is about one inch thick.

12. A method according to claim 2, wherein the vessel is a crucible for heating a metal charge to a melting temperature, and in which the heat-retention capability of said working liner is greater than the heat required to melt said charge.

13. A method according to claim 2, wherein said inserted form is heated to heat said working liner material to said setting temperature.

14. A method according to claim 2, wherein the insulating liner is formed from a precast fiber reinforced board containing between 73%-91% silica.

15. A method according to claim 14, wherein the binder is a phenolic resin.

16. A method according to claim 15, wherein the insulating liner is about one inch thick and has a K-factor of about 0.25 at room temperature.

17. A method according to claim 14, wherein the working liner is a heat set material that is predominantly $Al_2O_3$ and $SiO_2$.

18. A method according to claim 17, wherein the working liner has a density of about 145 pounds per cubic foot.

* * * * *

UNITED STATES PATENT AND TRADEMARK OFFICE
CERTIFICATE OF CORRECTION

PATENT NO. : 5,120,029
DATED : June 9, 1992
INVENTOR(S) : Robert J. Durbin It is certified that error appears in the above-identified patent and that said Letters Patent is hereby corrected as shown below:

```
    On the title page, item   "[76]  Inventor":
 "224 S. 118th Ct." should read:  224 S. 188th Ct --.
On the cover, under section "[63] Related U.S. Application
    Data":  "Jul. 19, 1988" should be -- Feb. 19, 1988 --.
Column 1, line 36, "reactively" should be -- relatively --.
```

Signed and Sealed this

Twenty-eighth Day of September, 1993

*Attest:*

BRUCE LEHMAN

*Attesting Officer*       Commissioner of Patents and Trademarks